(12) United States Patent
Rhodes et al.

(10) Patent No.: US 7,703,152 B2
(45) Date of Patent: Apr. 27, 2010

(54) HEAD AND NECK RESTRAINT SYSTEM

(76) Inventors: Carrol Leon Rhodes, 374 King Rd., Flat Rock, NC (US) 28731; Jason Smith, Rt. 1 Box 136E, Penrose, NC (US) 28766; Gary F. Bradley, 111 E. Glenwood La., Hendersonville, NC (US) 28792; Phillip J. Hawkins, 244 White Pine Dr., Asheville, NC (US) 28805

( * ) Notice: Subject to any disclaimer, the term of this patent is extended or adjusted under 35 U.S.C. 154(b) by 914 days.

(21) Appl. No.: 11/439,493

(22) Filed: May 22, 2006

(65) Prior Publication Data

US 2006/0260027 A1 Nov. 23, 2006

Related U.S. Application Data

(60) Provisional application No. 60/684,014, filed on May 23, 2005.

(51) Int. Cl.
*A42B 1/24* (2006.01)
(52) U.S. Cl. .............................................. 2/421; 2/422
(58) Field of Classification Search ..................... 2/421, 2/69, 411, 425, 468, 462; 280/290
See application file for complete search history.

(56) References Cited

U.S. PATENT DOCUMENTS

| | | | | |
|---|---|---|---|---|
| 3,841,590 A | | 10/1974 | Valentine | |
| 4,909,459 A | * | 3/1990 | Patterson | 244/122 AG |
| 4,923,147 A | * | 5/1990 | Adams et al. | 244/122 AG |
| 6,009,566 A | | 1/2000 | Hubbard | |
| 6,330,722 B1 | | 12/2001 | Betts | |
| 6,729,643 B1 | | 5/2004 | Bassick et al. | |
| 6,751,809 B1 | * | 6/2004 | Cooper et al. | 2/421 |
| 6,810,535 B1 | * | 11/2004 | Moloney | 2/411 |
| 6,813,782 B2 | * | 11/2004 | Kintzi et al. | 2/421 |
| 6,931,669 B2 | * | 8/2005 | Ashline | 2/422 |
| 7,155,747 B2 | * | 1/2007 | Baker | 2/422 |
| 2004/0055077 A1 | | 3/2004 | Wright | |
| 2005/0015858 A1 | | 1/2005 | Ashline | |

* cited by examiner

*Primary Examiner*—Danny Worrell
(74) *Attorney, Agent, or Firm*—Kenneth L. Green

(57) ABSTRACT

A head and neck restraint system includes a headpiece, a saddle, and tensioners connecting the headpiece to the saddle. The headpiece resides on top of a crew member's head and the saddle includes a saddle strap residing under the crew member's buttocks. The tensioners are pneumatic muscles which contract when a flow of gas is provided by gas generators. The gas generators are triggered by a G-sensor or by the initiation of a predetermined event. Triggering signals pass through a manifold from an ejection seat, aircraft, or vehicle. Contraction of the pneumatic muscles pulls the headpiece toward the saddle, thereby restraining the head, neck, and spine. The system is worn as an undergarment or incorporated into a garment. A manual adjustment provides head support during flight. The system is particularly useful for preventing head and neck injuries during ejection from or crash of an aircraft or vehicle.

20 Claims, 4 Drawing Sheets

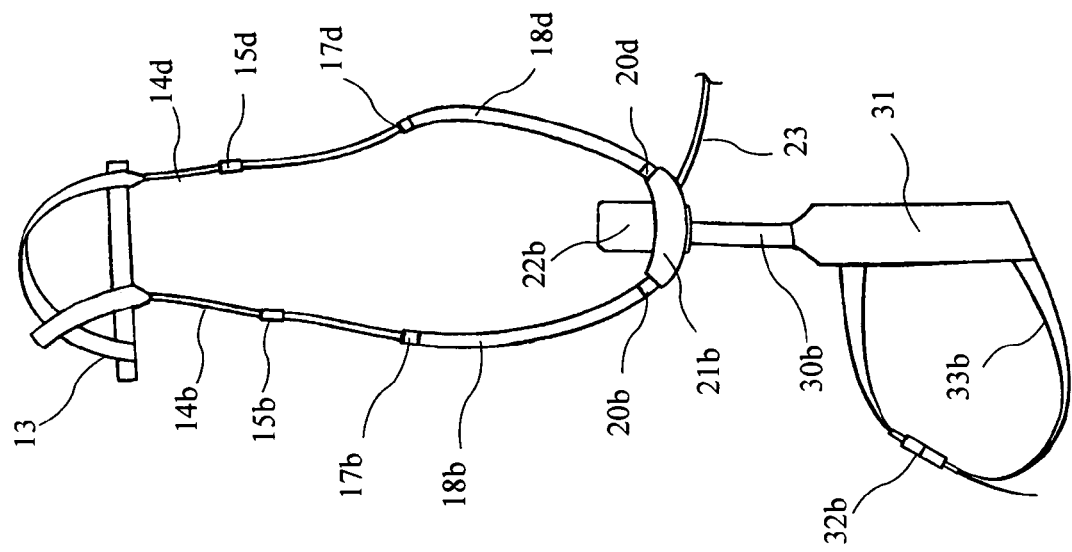
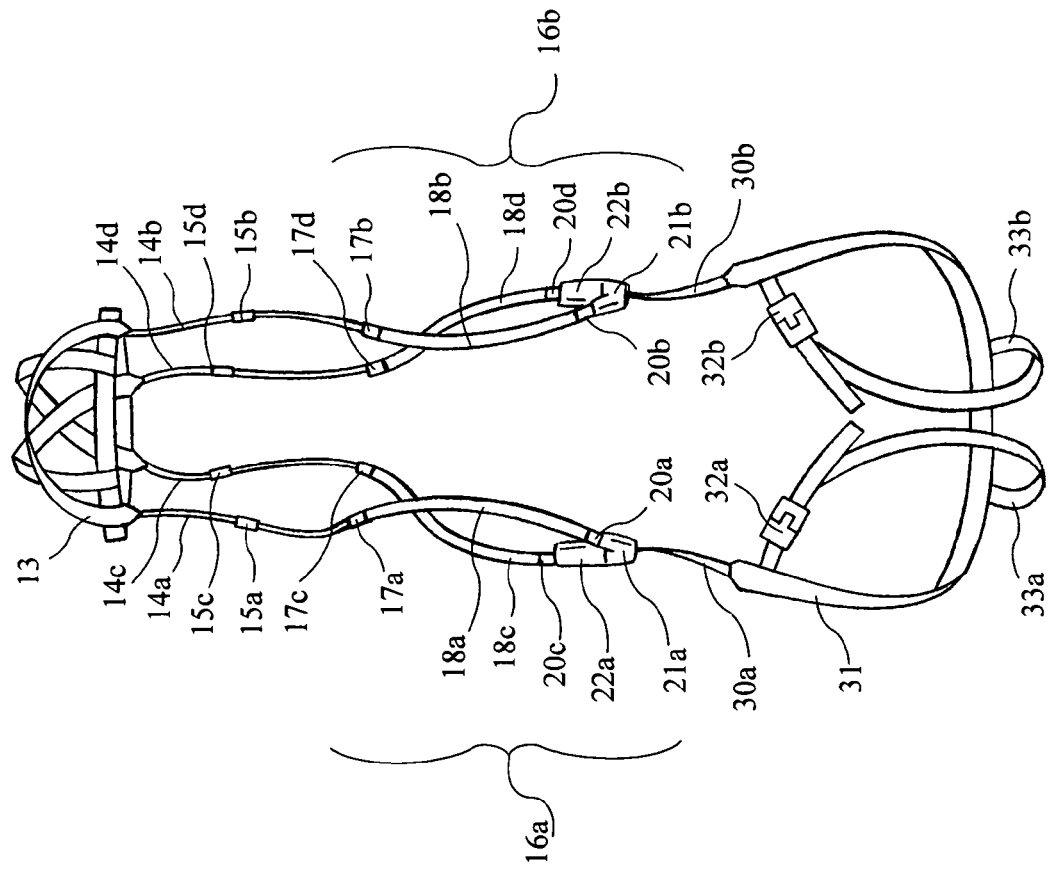
FIG. 2A
FIG. 2B

HEAD AND NECK RESTRAINT SYSTEM

The present application claims the benefit of U.S. Provisional Application Ser. No. 60/684,014, filed May 23, 2005, which application is incorporated herein by reference.

BACKGROUND OF THE INVENTION

The present invention relates to restraint systems which restrain a crew member body in high dynamic environments, such as during ejection from an aircraft or crash of a vehicle, and in particular to an improved system worn under normal gear for restraint of the head, neck, and spinal column.

Head and neck restraint systems have wide application to many injury prone environments including aircraft ejection. Because aircraft ejection presents one of the most complex and challenging environments for a restraint system, the background of the present invention will primarily be described in that context. Clearly, other applications fall within the scope of the present invention. Ejection sequences vary by manufacturer as well as by ejection mode. The ejection mode is related to altitude, airspeed, and in some cases, attitude. Generally, there is a Launch Phase, a Sustainer Rocket Phase, and a Recovery Phase. The following description is highly simplified.

The Launch Phase first prepares the seat for ejection by positioning (called haulback) of the crew member's torso with a ballistic-powered inertia reel. Haulback begins almost simultaneously with ejection initiation, as would head and neck restraint actuation. Next, a ballistic catapult guides the ejection seat upward to a point where there is little or no danger of flame impingement while the seat and crew member are still in the cockpit when the sustainer rocket(s) fire. Seat sensors detect the ejection conditions. All Launch Phase events occur within approximately 180 milliseconds and 39 inches of travel. During the Launch Phase, the crew member is exposed to possible spinal compression injury during initial catapult motion, neck injury from the sudden upward movement, head injury from headrest impact, and a whiplash-type injury from entry into a high-speed airstream.

The Sustainer Rocket Phase provides the force to propel the ejection seat away from the aircraft, clearing the empennage, to a height sufficient for successful parachute opening. The seat has selected a mode of operation for the Recovery Phase. The seat and crew member are fully presented to the effects of windblast and no longer connected to the aircraft by the catapult. The seat is free to pitch, roll, and yaw to more dangerous attitudes. During the Sustainer Rocket Phase, the crew member is exposed to possible windblast-related neck and limb injuries as well as spinal injury from dynamic overshoot as the spine extends after the initial compression of the launch phase.

The Recovery Phase, which includes parachute deployment and opening, is dependent upon altitude and airspeed. At low altitude and airspeed, the parachute will deploy immediately; at low altitude and high airspeed, the seat will delay parachute deployment until the airspeed is reduced by the drogue parachute; and at very high altitude, parachute deployment will be delayed until the seat and crew member drop to approximately 14,000 feet, descending under a drogue parachute to stabilize the seat/crew member mass. At parachute deployment, the crew member is released from the seat, which falls away. At high speed, inflation of the parachute causes an opening shock, transmitted directly to the crew member's body, which is free of the ejection seat. After full inflation, the crew member swings down under the parachute canopy and a survival kit deploys. During the Recovery Phase, the crew member is exposed to possible neck and/or spinal injury from the full-body whiplash effects of parachute opening shock.

The U.S. government and ejection seat manufacturers have historically recognized a need for a restraint system which reduces or eliminates head and neck injuries during and following aircraft ejection. Secondarily, but still significant, is the concern for spinal injuries. Such a system must meet many challenging requirements. Designing a system to perform within the high dynamic environment of aircraft ejections without radical changes to the ejection system is one challenge. Creating a system which can function in the limited human factors footprint of a high technology cockpit is another. Integrating with the multiple platforms of aircraft, electronics, ejection seat, and personal equipment is another. Accommodating the desires and requirements of pilots and maintenance crews is another challenge.

Unfortunately, past concepts have encountered substantial problems of varying types, such as dependency on seat stabilization, protection in one axis while load induction in other axes, major changes to seat design structures or configurations, dependence on the tautness of existing harnesses, inability to withstand high velocity windblast, and/or the lack of crew acceptance.

BRIEF SUMMARY OF THE INVENTION

The present invention resolves the above and other needs by providing a restraint system which addresses head and neck protection during high-speed ejection from an aircraft. The crew member is protected from ejection initiation through parachute opening. A unique aspect of the restraint system according to the present invention is that it is crew worn as a garment. Another feature is that it allows the crew member freedom of movement to perform standard tasks, but has the option of manual adjustment to provide support against head-borne mass. Additionally, the restraint system is capable of interfacing with the seat, aircraft, and/or vehicle in multiple ways, depending on user requirements.

The restraint system may be initiated (or triggered) by a variety of triggering methods and/or devices. Two examples of initiation (or triggering) methods/devices are G-sensing and providing a seat signal. Initiation by G-sensing at the onset of the ejection sequence includes the utilization of a sensor which may be man-mounted (for example, integrated into the restraint system, or worn separately), seat mounted, or aircraft mounted, and enables the use of a passive system. Initiation by a seat signal may utilize a signal from an ejection system or may be triggered by seat motion associated with ejection. Seat signal triggering may offer greater reliability and is relatively easy to achieve. Such seat signal may be provided by a direct connection and may be more effective than G-sensing, but also may require an active "hook-up" by the crew member during pre-flight preparation, and such hook-up requirement may be objectionable to the crew member. A seat signal provided using wireless technology is an alternative to a hard wire connection and may overcome crew member objections. The restraint system may respond to other initiation approaches and other triggering devices, and a restraint system as described herein which responds to any triggering device is intended to come within the scope of the present invention.

Regardless of the initiation method, the restraint system will appropriately preload the crew member's spine prior to and/or during catapult stroking of the ejection seat, thus significantly reducing the chance of injurious effects caused by dynamic overshoot. Once activated, the system will restrain the crew member's head from movement in all axes except negative-Z (e.i., down with respect to the seat). When the head attempts to move radically as a result of high dynamics and accelerations, the system transfers the forces through restraint straps and into the lower torso extremity of the crew member. This consequently reduces potentially harmful head and neck loads.

The present invention contemplates optional variations of the baseline design which include: 1) Utilizing an alternate pressure source at selected locations of the restraint system to relieve neck tension during extended operations, which will reduce crew member fatigue and improve crew member endurance; 2) Utilize the basic design to protect rotary-wing crew members from crash or hard-landing loads by sensing impact accelerations or predicted impact, and initiating the restraint system; 3) Utilize the basic design to protect ground vehicle occupants from crash loads by sensing impact accelerations or predicting impacts and initiating the restraint system; and 4) Utilize the basic design to incorporate an upper arm restraint by expanding the restraint system design to capture and restrain the crew member's arm from the elbow to the shoulder.

The present invention redistributes forces which would be otherwise applied to the head, and ultimately the neck. The crew member's head is restrained by a skullcap or cradle structure having low elastic properties and connected to a harness structure residing about the lower torso much like a parachute harness. When head accelerations (such as during aircraft ejection or vehicle crash) pull the skullcap vertically, side to side, and/or fore and aft, and with the restraint system taut, a percentage of loads is transferred to the lower torso of the crew member. Because the crew member's mobility should not be affected during normal aircraft operation, substantial "slack" within the harness is preferably provided when the harness is not taut to accommodate the crew member's movement in the performance of normal missions and maneuvers (i.e., Turning to "check six"). However, prior to or during ejection, the slack in the harness is removed, consequently applying compression from the top of the head through the spine to the load bearing flesh area in the lower extremities.

The present invention provides "slack" take-up within the load bearing structure using pneumatic muscle and cold gas generator technology. The system may be activated by the accelerations induced during the catapult-stroking phase of the ejection sequence, by a wireless signal from the seat or vehicle, or by a signal provided by a direct connection to the seat or vehicle. Regardless of the source of the signal, a gas generator sized to the requirements is triggered to activate the pneumatic muscles, thus inducing contraction of the pneumatic muscles resulting in "slack" take-up and crew member compression between the head, shoulders, and lower torso. A saddle type harness is preferred to minimize flesh compression and thus minimize the "slack" take-up requirements. Approximately 4.5 inches of harness take-up is required to transition from normal, comfortable operational fitment of the system to an active restraint effectively limiting head movement. When timely activation of the tensioning device is achieved, an additional advantage associated with spinal pre-compression results. Pre-compressing the spine or upper torso minimizes injurious dynamic overshoot upon and after G loading.

Activating the restraint system with the G-load provided by the catapult is practical because there is a significant difference between the crew member's maximum operational G-load tolerance and the minimum G-load during an ejection. Therefore, the restraint system of the present invention may include a high trigger threshold for sensing the acceleration during ejection to activate the system and thereby avoid false activation during flight maneuvers. Sensing G-loads also allows a system design which does not require a special seat or modifications to existing seats. The trigger threshold relies on the catapult capacity and thrust profile. Preferably, the G-sensor will detect motion and then signal the pressure generator to fire and start inflation of the pneumatic muscle (s), before the ejection seat has moved into the airstream. A G-sensor is a good device for use in a helicopter crash scenario or a ground vehicle crash, but methods with less delay may be the optimum method for use with an ejection seat. Preferably, the gas source provides a gas flow to the pneumatic muscles within 15 milliseconds of the event initiation, and the pneumatic muscles will be substantially full within 30 milliseconds, much like an airbag in an automobile. Again, the pressure device could be triggered with a G-sensitive activator making the system a totally passive system.

Activating the subject restraint system with a wireless signal from the seat or vehicle is the least invasive of the preferred methods. Various technology options exist for low-power, miniature signal generators and receivers. Such signal generators, included in the ejection seat timing system, would alert the restraint system receiver of ejection initiation without a direct connection. Direct connections are another method, which requires wiring or tubing as well as a direct hookup between the crew member-worn system and the ejection seat or aircraft.

The restraint system according to the present invention includes a pneumatic muscle assembly. The pneumatic muscle assembly preferably contains an inflatable structure enclosed by, bonded to, or integral with a braided mesh sheathing or similar shape-controlling structure. Preferably, one end of the pneumatic muscle has a gas inlet port which attaches to the manifold assembly (described below), and the other end has an attachment for the tension cords (described below). Gas pressure from the manifold assembly enters and expands the inflatable structure. Upon inflation, the braided sheathing allows inflation only in a radial direction, causing the pneumatic muscle assembly to contract (i.e., shorten) and apply tension to restrain the wearer. The configuration of the pneumatic muscle assembly may vary depending on the anthropometric needs of the crew member population, for example, a third percentile female may require a shorter pneumatic muscle with less contraction than a ninety-eighth percentile male.

The restraint system may also include self-wicking material, except for the load bearing structure, which is designed to regulate the body temperature by removing perspiration from the surface of the skin. The head and neck protection properties combined with temperature regulation properties provides attractive features to further crew member acceptance of the restraint system. Another embodiment incorporates the head and neck protection system into a flight suit or other garment to avoid an additional layer of equipment.

The restraint system according to the present invention further includes a manifold assembly. The configuration of the manifold assembly may vary depending on the source of the initiation signal, for example, either a man- or seat-mounted G-sensor, a direct-connected seat or aircraft signal generator, or a wireless signal from the seat or aircraft. The manifold assembly houses an initiator (or gas generator) assembly and related firing mechanisms, such as a signal receiving device, a battery, wiring, gas port(s), and/or connections to other devices. Upon receiving a signal, the gas generator assembly fires, providing a flow of gas which is routed to the pneumatic muscles. The manifold assembly preferably reduces or eliminates high pressures and high gas temperatures generated by the gas generator assembly against the crew member's body. The pneumatic muscles are preferably routed through channels in a garment portion of the restraint system.

The subject restraint system may further include an option for integrating a manually controlled pressure source which pressurizes specific pneumatic muscles to reduce crew member fatigue caused by head-borne mass. The manually controlled pressure source may be a hand pump or a manually controlled system which utilizes pressure from the G-suit or other pressure source.

BRIEF DESCRIPTION OF THE SEVERAL VIEWS OF THE DRAWING

The above and other aspects, features, and advantages of the present invention will be more apparent from the following more particular description thereof, presented in conjunction with the following drawings wherein:

FIG. 2A is a front view of the restraint system with the garment and skull cap removed to reveal the components housed within the garment and skull cap.

FIG. 2B is a side view of the restraint system with the garment and skull cap removed to reveal the components housed within the garment and skull cap.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
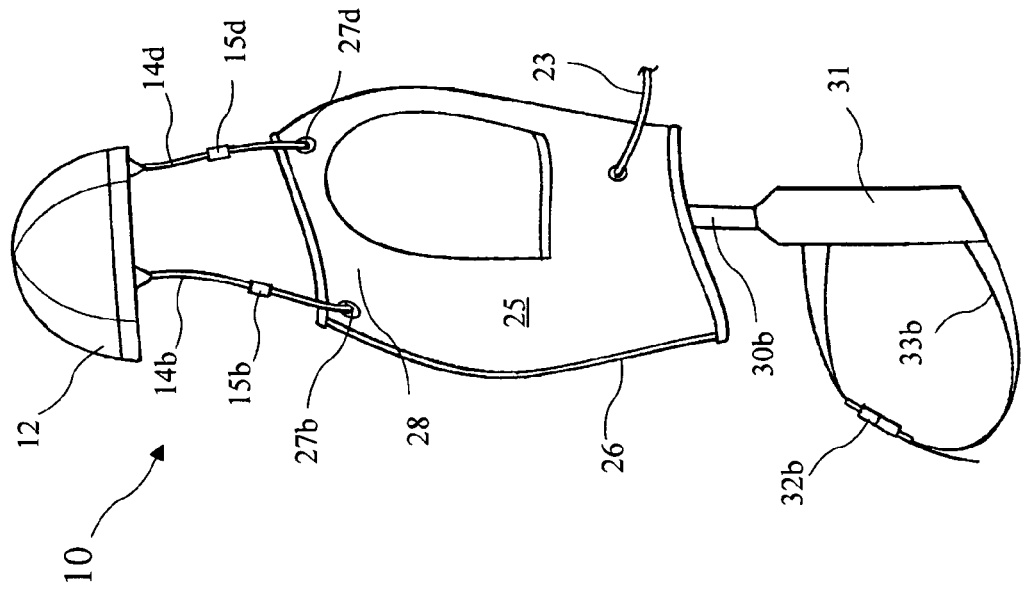
FIG. 1A is a front view of a restraint system according to the present invention wherein the restraint is enclosed in a garment and a skull cap.
Figure 1B:
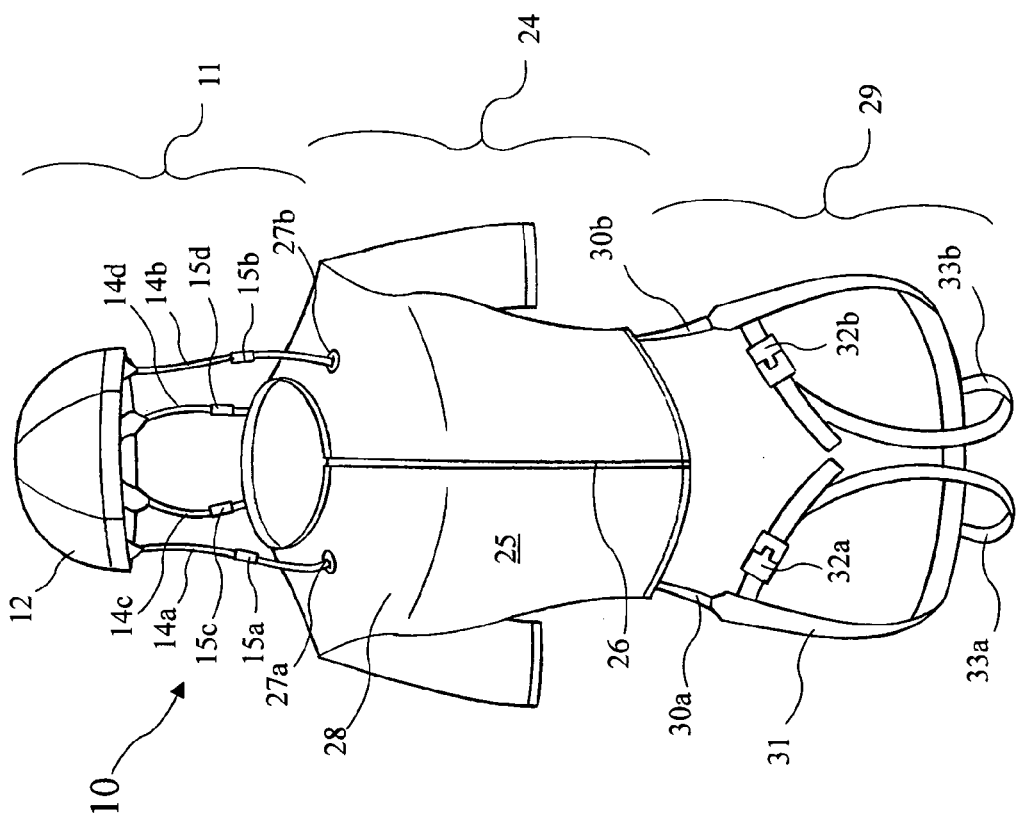
FIG. 1B is a side view of the restraint system.

A front view of a restraint system 10 according to the present invention is shown in FIG. 1A, and a side view of the restraint system 10 is shown in FIG. 1B. The restraint system 10 includes a skull cap assembly 11, a garment assembly 24, and a harness comprising a saddle assembly 29. The restraint system 10 provides a flexible and lightweight system which may be worn under flight clothing which restrains the head and neck against ejection seat motion and windblast forces encountered upon initiation of the ejection sequence. The restraint system 10 also restrains the spinal column against dynamic overshoot resulting from ejection seat motion.

The skull cap assembly 11 includes the skull cap 12, a head cradle 13 (see FIGS. 2A and 2B) under the skull cap, right front tension cord 14a, left front tension cord 14b, right rear tension cord 14c, and left rear tension cord 14d attached to the head cradle 13, and tension limiters 15a, 15b, 15c, and 15d attached to respective tension cords 14a-14d. The tension cords 14a-14d are measured and shortened during initial fitting of the restraint system 10 to the crew member. The length of the tension cords 14a-14d is sufficient to cover the maximum size in the anthropometric range of the crew member population.

The tension limiters 15a-15d may function as stops to reduce travel of the tension cords 14a-14d, thereby controlling head alignment. During fitting to the crew member, the tension limiters 15a-15d are crimped, sewn, or tightened to the tension cords 14a-14d according to individual anthropometric requirements. Upon system initiation, the tension cords 14a-14d are retracted until the tension limiter 15a-15d encounters a grommet 27a-27d in the garment 25, thereby limiting the travel of the tension cords 14a-14d. The retraction force is then transferred to the crew member shoulders through a yoke portion 28 of the garment assembly 24. The yoke portion 28 is a structural panel across the shoulders, preferably residing on the interior of the garment 25. The purpose of the yoke 28 is to transfer load to the crew member's shoulders if the tension limiters 15a-15d bottom out on the grommets 27a-27d. The tension limiters 15a-15d may be used to ensure that excessive force is not exerted on the crew member's head. Pneumatic muscles 18a-18d and gas generators 22a and 22b (see FIGS. 2A and 2B) provide tension to the tension cords 14a-14d and are sized to prevent over tensioning, and the tension limiters 15a-15d may be used as an added limit on tensioning.

The garment 25 is preferably made from fabric and houses tensioner subsystems 16a, 16b (see FIGS. 2A and 2B) and may include channels or guides for locating the tensioner subsystems 16a, 16b and the saddle assembly 29 properly about the crew member. The channels or guides may be attached, for example, sewn, in the garment 25 to guide the straps 30a-30b and restrain the pneumatic muscles 18a-18d, the manifold assemblies 21a, 21b, and tension cords 14a-14d preventing them from slipping out of position or off the crew member's body. In alternative embodiments, a flight suit or anti-G suit could be modified to position the tensioner subsystem 16a-16b and saddle assembly 29.

The garment assembly 24 incorporates a closure 26, for example, a zipper or zip-lock device or the like, which enables ease of donning. The garment 25 may be manufactured from a number of modern textiles, preferably soft, thin, breathable, and pliable with wicking characteristics for cooling and transmission of perspiration. In alternative embodiments, the restraint system 10 may also be incorporated into other clothing, such as a flight suit or an anti-G suit. Such alternatives are dependent upon the desires of the users.

The saddle assembly 29 attaches to the manifold assemblies 21a and 21b of the tensioner subsystems 16a and 16b (see FIGS. 2A and 2B). The saddle assembly 29 consists of two side straps 30a and 30b, one saddle strap 31, two adjustable connectors 32a and 32b, and two leg straps 33a and 33b. The side strap 30a connects to the manifold assembly 21a and the side strap 30b connects to the manifold assembly 21b. The side straps 30a and 30b are adjustable to the crew member. During the one-time fitting process, each side strap (which slides through adjustment slots on the manifold assembly) may be adjusted to the anthropometric needs of the wearer, to provide a comfortable and secure fitment. Excess strap length may be trimmed or stowed accordingly.

Each side strap 30a and 30b connects to opposing sides of the saddle strap 31. The saddle strap 31 is a wide "U" shaped structural strap which is preferably approximately 1.75 inches wide and preferably forms a flexible seating surface beneath the buttocks which transmits head loads to lower torso extremities of the crew member. The leg straps 33a and 33b are attached to the base and sides of the saddle strap 31 forming loops around the upper thigh and crotch to preferably prevent the saddle strap 31 from moving on the crew member regardless of the crew member's posture. Adjustable connectors 32a and 32b attach to the leg straps 33a and 33b respectively and enable adjustment of the lengths of the leg straps 33a and 33b by the crew member.

A front view of the restraint system 10 with the garment assembly 24 and skull cap 12 removed to reveal the components housed within the garment assembly 24 and skull cap 12 is shown in FIG. 2A, and a side view of the restraint system 10 with the garment assembly 24 and skull cap 12 removed to reveal the components housed within the garment assembly 24 and skull cap 12 is shown in FIG. 2B. The restraint system 10 includes the skull cap assembly 11 which includes a skull cap 12 (see FIGS. 1A and 1B), the head cradle 13, the four tension cords 14a-14d, and the four tension limiters 15a-15d. The skull cap 12 is formed to reside over the head cradle 13 and minimize pressure points applied to the head by the head cradle 13. The skull cap 12 may be manufactured from a number of modern textiles and is preferably soft, thin, breathable, and pliable with wicking characteristics for cooling and transmission of perspiration. The skull cap 12 may be attached to the head cradle 13 or be separate. In alternative embodiments, the skull cap 12 may be eliminated if the customer chooses to attach the tension cords to a helmet or to wear the cradle over an existing crew member's skull cap. The head cradle 13 resides on the upper portion of the crew member's head, and when tensioned, restricts the head from moving. The tension cords 14a-14d connect to the tensioner subsystems 16a, 16b via adjustment fittings 17a-17d respectively.

The tension cords 14a-14d enter the garment assembly 24 through tension limiter grommets 27a-27d respectively, which grommets 27a-27d are built into or attached to the garment assembly 24. The tension limiters 15a-15d, one for each tension cord 14a-14d respectively, are positioned according to the anthropometric requirements of the crew member and secured to the tension cords 14a-14d above the garment assembly 24 entrance, such that upon activation of the tensioner subsystem 16 the load applied to the head and neck is controlled. Further, upon activation of the tensioner subsystems 16a, 16b, the tension limiter grommets 27a-27d transfer the remaining load applied by the tensioner subsystems 16a, 16b from the head into the torso through the yoke 28 (see FIGS. 1A and 1B). The torso load, dictated by the placement of the tension limiters 15a-15d, is distributed across the shoulders of the crew member by the yoke 28 built into the garment assembly 24.

The restraint system 10 includes a right tensioner subsystem 16a and a left tensioner subsystem 16b. The tensioner subsystems 16a and 16b include adjustable fittings 17a-17d, pneumatic muscle assemblies 18a-18d, port connectors 20a-20d, manifold assemblies 21a and 21b, and gas generators 22a and 22b. The manifold assemblies 21a and 21b house or connect to the gas generators 22a and 22b.

The manifold assemblies 21a and 21b receive and route a flow of gas through a filter 42 (see FIG. 4) and to the pneumatic muscle assemblies 18a-18d. The filter 42 slows the speed of the expanding gas and removes particulates from the gas. Alternate embodiments of the manifold assembly 21 may include provisions for 1) a button-type battery 43 or a connection to an external power source, 2) a G-sensor 44 or a wireless communications receiving device 45, 3) a connection 47 for manual pressurization/depressurization, 4) a device for relieving gas pressure 47 from the system after parachute opening, and/or other such devices. The outlet port for the flow of gas includes a fitting for connection to the pneumatic muscle(s) 18a-18d. The manifold assemblies 21a and 21b also provide for attachment to and/or adjustment 48 of the side straps 30a and 30b on the saddle assembly 29.

The manifold assemblies 21a and 21b are a sealed environment to prevent pressurized gas from escaping and coming into contact with the crew member's body. The gas generators 22a and 22b are preferably cool gas generators and the burn rate of the gas generators 22a and 22b will preferably be selected to reduce heat production to an acceptable level. Initial heat produced by the generation of the gas flow will be reduced by the filter and conducted to the manifold mass. The gas generators 22a and 22b are similar to an automobile airbag gas generator, which generates some heat, but remains cool to the touch. Channels or pockets for retaining the tensioner subsystems 16a and 16b in the garment portion 24 provide additional protection from heat and by the time the pressure is released from the system, any excessive heat will have been dissipated.

The tensioner subsystems 16a and 16b are attached to the skull cap assembly 11 by the adjustable fittings 17a-17d. The tensioner subsystem 16a includes the two adjustment fittings 17a and 17c and the tensioner subsystem 16b includes the two adjustment fittings 17b and 17d. The adjustment fittings 17a-17d connect to the tension cords 14a-14d respectively.

The gas generators 22a and 22b preferably use a chemical reaction system initiated by a mechanically, ballistically, or electrically initiated gas generator, similar to an automobile airbag gas generator. The preferred chemical reaction produces a cool gas which rapidly expands to fill the available space, which space in the case of the present invention is provided by the pneumatic muscles 18a-18d. The burn rate of the gas generators 22a, 22b is limited to minimize heat generation. The pneumatic muscles 18a-18d and the gas generators 22a, 22b are preferably sized to preclude over pressurizing the system, although other means may be exercised to prevent over pressurizing.

The right front pneumatic muscle assembly 18a connects between the adjustable fittings 17a and the port connector 20a, the left front pneumatic muscle assembly 18b connects between the adjustable fittings 17b and the port connector 20b, the right rear pneumatic muscle assembly 18c connects between the adjustable fittings 17c and the port connector 20c, and the left rear pneumatic muscle assembly 18d connects between the adjustable fittings 17d and the port connector 20d. The port connectors 20a and 20c are connected to the right manifold assembly 21a and the port connectors 20b and 20d are connected to the left manifold assembly 21b.

The right gas generator 22a is connected to the right manifold assembly 21a, and the left gas generator 22b is connected to the left manifold assembly 21b. The gas generators 22a and 22b provide a flow of gas which activates the restraint system 10. The gas generators 22a and 22b may be triggered by a built-in G-sensor or by an external signal, for example, from the crew member seat or vehicle, in other embodiments. When triggered, the gas generators 22a and 22b provide a gas flow through the manifold assemblies 21a and 21b, which directs the flow into a pressure vessel of the front and back pneumatic muscles 18a-18d. The pneumatic muscles 18a-18d consequently inflate and contract, thus tensioning and activating the restraint system 10. A support adjustment source 23 may be connected to the manifold assemblies 21a and 21b to provide the crew member with an option of inflating selective pneumatic muscles 18a-18d to improve comfort and/or reduce fatigue on the neck caused by an unbalanced helmet weight over time. The source of gas may be a hand pump/bulb for ambient air, a separate pressurized tank, or a tap onto the anti-G suit or other acceptable source which would tension the pneumatic muscles 18a-18d. The particular source is dependent on the customer's needs.

Figure 3A:
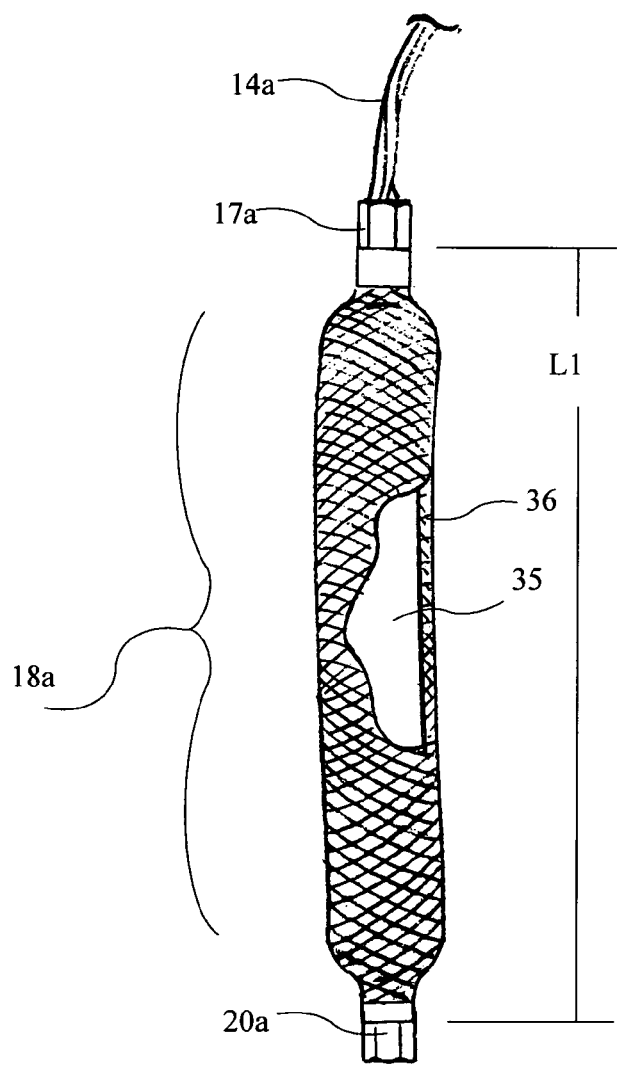
FIG. 3A is a front view of a pneumatic muscle assembly portion of the present invention with a cutaway to reveal the inner components.
Figure 3B:
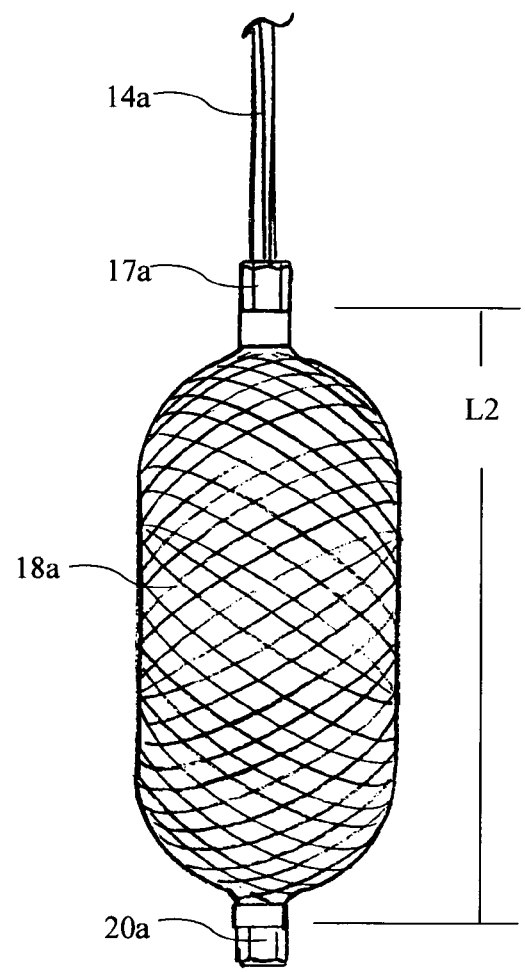
FIG. 3B is a side view of the pneumatic muscle depicting the contraction achieved by inflation.

A detailed view of the pneumatic muscle 18a in a relaxed state is shown in FIG. 3A, and a detailed view of the pneumatic muscle 18a in an inflated state is shown in FIG. 3B. The pneumatic muscles 18b-18d are preferably similar to the pneumatic muscle 18a, but the pneumatic muscles 18c and 18d (the rear pneumatic muscles) may be different from the pneumatic muscles 18a and 18b (the front pneumatic muscles), for example, may have a different length or a different percentage contraction. The pneumatic muscles 18a-18d preferably comprise four basic components: a braided mesh sheathing 36; a bladder 35 located inside the sheathing 36 that is capable of expanding when pressurized; the adjustment fitting 17a on one end of the pneumatic muscle 18a, and a port connector 20a on an opposite end of the pneumatic muscle 18a. Upon pressurization, the bladder 35 expands forcing the sheathing 36 to increase in diameter and shorten from a relaxed length L1 to an inflated length L2. The shortening length L2 may be shortened by as much as approximately 40 percent of the relaxed length L1 (i.e., L2 may be as small as approximately 0.60 times L1). The adjustment fitting 17a and the port connector 20a on the pneumatic muscle 18a cause attached items to be drawn together by the retraction, providing a strong tensioning element in a small simple device which will function when twisted or curved. The port connector fitting 20a also serves as a passage for the pressurizing gases.

Figure 4:
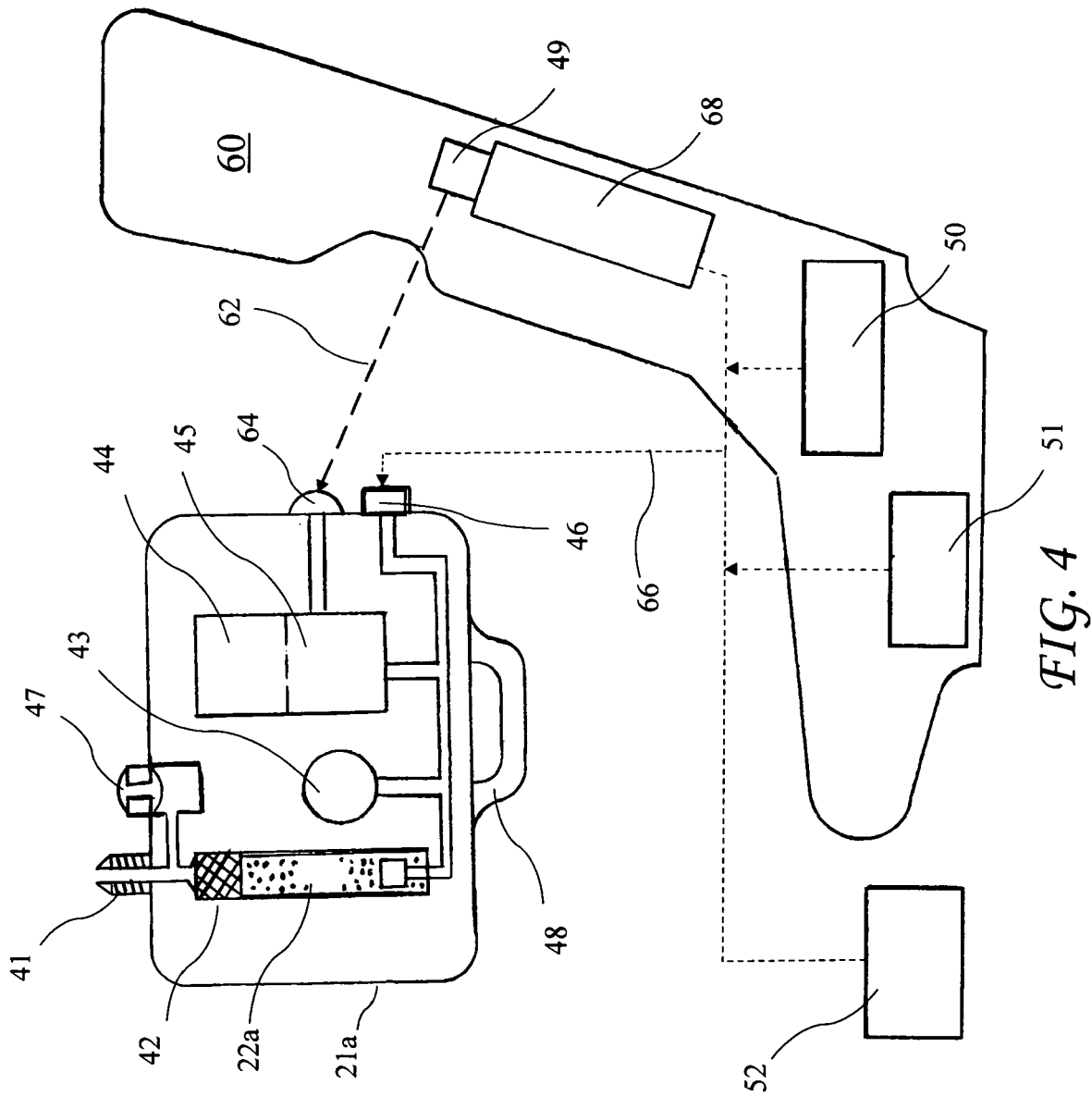
FIG. 4 is a schematic view of the manifold assembly portion of the present invention wherein the relationships of several and various embodiments are envisioned.

A diagram of the manifold assembly 22a and a generic seat 60 of the present invention is shown in FIG. 4, wherein alternative elements are described. The manifold assembly 21b is generally similar to the manifold assembly 21a. The manifold assembly 21a may be designed to receive electrical or pressure signals 66 via a direct connection port 46 or to receive wireless signals 62 via a receiver 64, depending on the capabilities of the seat, vehicle, or customer requirements. The seat 60 may produce signals from 1) an electronic sequencer 68 transmitted via a wireless communications device 49, 2) an electronic sequencer 68 transmitted via direct electrical or pressure signals 66, 3) a gas pressure or electrical signal device 50 transmitted via direct electrical or pressure signals 66, and/or 4) an on-seat G-sensor 51 transmitting signals via direct electrical or pressure signals 66; and for vehicle crash situations, a signal may be produced by 5) a vehicle-mounted G-sensor 52 transmitted via direct electrical or pressure signals 66. Clearly, a combination of signal sources may be employed, depending on customer design requirements. Within the manifold assembly 21a, a wireless signal 62 would be processed by a signal processor 45 to fire the gas generator 22a, with supplemental power from a battery 43 if needed. A signal from a G-sensor 44 within the manifold assembly 21a would be processed by a signal processor 45 to fire the gas generator 22a, with supplemental power from a battery 43 if needed. An electrical signal 66 received by direct connection 46 would either be processed by the signal processor 45 or would immediately fire the gas generator 22a, depending on design requirements. Finally, a gas pressure signal 66 received by direct connection 46 would either be processed by the signal processor 45 or would immediately fire the gas generator 22a. An outlet port 41 is provided for connecting to the port connector fittings 20a-29d (see FIGS. 2A and 2B).

Continuing with FIG. 4, the gas generator 22a is shown residing in the manifold assembly 21a. The gas generator 22a may also be attached to the exterior of the manifold assembly 21a, or be connected by tubing to the manifold assembly 21a. A filter 42 filters gasses generated by the gas generator 22a prior to entry into the pneumatic muscle 18a or 19c. A pressure relief/support adjustment port 47 allows regulation of the gasses provided by the gas generator 22a to the pneumatic muscle 18a-18d. A G-sensor 44 may be included in the manifold assembly 21a to detect the ejection event, and to trigger the gas generator 22a.

In a first alternative embodiment of the restraint system 10, the support adjustment source 23 provides adjustable inflation pressure from outside source(s) to tension selected pneumatic muscles to support the head against head-borne mass. In a second alternative embodiment of the restraint system 10, the direct input connector 46 provides direct interface with the aircraft or ejection seat for precise timing of gas generator 22a and 22b initiation within the ejection sequence. In a third alternative embodiment of the restraint system 10, portions of the restraint system may be incorporated into other flight gear, such as a flight suit, jump suit, pressure suit, vest assembly, or similar garment. Additionally, a fourth alternative embodiment of the restraint system may include an upper arm restraint which is an optional use of the existing pneumatic muscle retraction of the tension cords. Such supplemental retraction of the upper arm or elbow of a flight suit or other garment may be used to restrain the arms against limb abduction during high-speed windblast, and may be provided dependent upon the desires and needs of the crew members.

While the invention herein disclosed has been described by means of specific embodiments and applications thereof, numerous modifications and variations could be made thereto by those skilled in the art without departing from the scope of the invention set forth in the claims.

We claim:

1. A restraint system comprising:
 a headpiece configured for wearing on a crew member head;
 a harness configured for wearing on a crew member body;
 tensioning members individually connected in parallel between the headpiece to the harness, each of the tensioning members extending vertically having a lower end connected to the harness and an upper end connected to the headpiece; and
 a triggering device responsive to a triggering event and causing the tensioning members to contract vertically in length upon the occurrence of the triggering event and to pull the headpiece toward the harness, thereby creating tension between the crew member head and the crew member body.

2. The restraint system of claim 1, further including a G-sensor wherein the G-sensor senses the triggering event and causes the tensioning members to contract.

3. The restraint system of claim 1, wherein the triggering device is connected to a G-sensor wherein the G-sensor senses the triggering event and causes the tensioning members to contract.

4. The restraint system of claim 1, further including at least one gas generator triggered by the triggering device and generating gas to cause the tensioning members to contract.

5. The restraint system of claim 4, wherein the tensioning members are pneumatic muscles which receive a flow of gas from the at least one gas generator and shorten in length in response to the flow of gas.

6. The restraint system of claim 4, further including at least one manifold assembly configured to provide a flow of gas to the tensioning members thereby causing the tensioning members to contract.

7. The restraint system of claim 1, wherein the headpiece comprises a cap configured to reside over the crew member head.

8. The restraint system of claim 7, wherein the tensioning members comprise a plurality of pneumatic muscle connected to spaced apart points on the headpiece.

9. The restraint system of claim 8, wherein the tensioning members comprise a right front pneumatic muscle, a left front pneumatic muscle, a right rear pneumatic muscle, and a left rear pneumatic muscle connected to respective spaced apart points on the headpiece.

10. The restraint system of claim 8, further including a garment assembly worn on a torso of the crew member, wherein the garment includes channels for positioning the pneumatic muscles.

11. The restraint system of claim 10, wherein:
the pneumatic muscles are connected to the headpiece by tension cords;
the tension cords enter the garment passing through grommets;
tension limiters reside on each tension cord above the grommets; and
wherein the grommets restrict the passage of the tension limiters into the garment and thereby limit the tension placed on the headpiece.

12. The restraint system of claim 11, wherein the garment includes a yoke portion residing on the interior of the garment above shoulders of the crew member thereby transferring the tension to the shoulders of the crew member when the tension limiters are pulled against the grommets.

13. The restraint system of claim 1, wherein the harness comprises a saddle portion including a saddle strap residing under buttocks of a crew member.

14. The restraint system of claim 1, wherein the triggering event produces at least one signal selected from the group consisting of a mechanical signal, a gas-pressure signal, an electrical signal, and a wireless signal to the triggering device and causes the tensioning members to contract.

15. The restraint system of claim 1, further including self-wicking material, thereby regulating body temperature by removing perspiration from skin surfaces.

16. A restraint system comprising:
a headpiece configured for wearing on top of a crew member head;
a saddle configured for wearing on a crew member lower body;
monotonically vertically rising pneumatic muscles connected between the headpiece and the harness;
a gas source for providing a flow of gas to the pneumatic muscles; and
a triggering device responsive to a triggering event and causing the gas source to provide the flow of gas to the pneumatic muscles and causing the pneumatic muscles to contract upon the occurrence of the triggering event and to pull the headpiece toward the harness, thereby creating tension between the crew member head and the crew member body.

17. The restraint system of claim 1, wherein the tensioning members provide at least approximately 4.5 inches of takeup.

18. The restraint system of claim 1, wherein the tensioning members comprise vertically residing pneumatic muscle, residing below the wearer's neck.

19. The restraint system of claim 1, wherein:
tension cords connect the tensioning members to the headpiece; and
a tension limiter resides on each tension cord and limits the vertical movement of each tension cord to limit the tension placed on the headpiece.

20. A restraint system comprising:
a headpiece configured for wearing on a crew member head;
a harness configured for wearing on a crew member body;
a plurality of pneumatic muscle connected to spaced apart points on the headpiece and connecting the headpiece to the harness;
a garment assembly worn on a torso of the crew member, wherein the garment includes channels for positioning the pneumatic muscles; and
a triggering device responsive to a triggering event and causing the tensioning members to contract upon the occurrence of the triggering event and to pull the headpiece toward the harness, thereby creating tension between the crew member head and the crew member body.

* * * * *